(12) United States Patent
Sengupta et al.

(10) Patent No.: US 10,764,637 B2
(45) Date of Patent: Sep. 1, 2020

(54) TARGETED CONTENT DELIVERY

(71) Applicant: Verizon Patent and Licensing Inc., Arlington, VA (US)

(72) Inventors: Ballori Sengupta, San Jose, CA (US); Michael Parker, Santa Cruz, CA (US); Joaquin A. Delgado, Fremont, CA (US); David Hoyt, Livermore, CA (US); Judes B. Sarmiento, Redwood City, CA (US); Kurt Eckhardt, Santa Clara, CA (US); Stefan Estrada, San Jose, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 15/650,275

(22) Filed: Jul. 14, 2017

(65) Prior Publication Data

US 2019/0020922 A1   Jan. 17, 2019

(51) Int. Cl.
*H04N 7/173* (2011.01)
*H04N 21/462* (2011.01)
*H04N 21/472* (2011.01)
*H04N 21/4402* (2011.01)
*G06F 3/0482* (2013.01)
*H04N 21/258* (2011.01)
*H04N 21/25* (2011.01)

(52) U.S. Cl.
CPC ....... *H04N 21/4622* (2013.01); *G06F 3/0482* (2013.01); *H04N 21/251* (2013.01); *H04N 21/25808* (2013.01); *H04N 21/25833* (2013.01); *H04N 21/25841* (2013.01); *H04N 21/25883* (2013.01); *H04N 21/4402* (2013.01); *H04N 21/472* (2013.01); *H04N 21/47202* (2013.01); *H04N 21/47205* (2013.01)

(58) Field of Classification Search
CPC .......... H04N 21/4622; H04N 21/4782; H04N 21/8586; H04N 21/4788; H04N 21/4722; H04N 21/235; H04N 21/435
USPC .............. 725/87–93, 109–116; 709/217–232
See application file for complete search history.

(56) References Cited

U.S. PATENT DOCUMENTS

| 7,916,755 B2 * | 3/2011 | Hasek | H04N 7/17318 370/464 |
| 8,761,138 B2 * | 6/2014 | Moisanen | H04W 76/027 370/328 |

(Continued)

*Primary Examiner* — Annan Q Shang

(57) ABSTRACT

A device can receive, via a single interface of a device, information identifying video content to be targeted to user devices associated with an Internet protocol television (IPTV) service. The device can receive, via the single interface of the device, configuration information relating to the video content. The device can store the information identifying the video content in association with the configuration information. The device can receive information associated with a user device of the set of user devices. The device can generate, using the information identifying video content and the configuration information, targeted information relating to the video content based on the information associated with the user device. The device can provide, to the user device, the targeted information relating to the video content to permit the user device to provide, for display, the targeted information relating to the video content in association with the IPTV service.

20 Claims, 10 Drawing Sheets

(56) References Cited

U.S. PATENT DOCUMENTS

| | | | |
|---|---|---|---|
| 2005/0216940 A1* | 9/2005 | Black | H04N 7/163 725/87 |
| 2008/0040742 A1* | 2/2008 | Howcroft | H04N 21/25866 725/34 |
| 2008/0092158 A1* | 4/2008 | Bhatnagar | H04N 7/17318 725/34 |
| 2008/0127255 A1* | 5/2008 | Ress | H04N 7/17318 725/38 |
| 2008/0141317 A1* | 6/2008 | Radloff | H04N 5/44582 725/87 |
| 2008/0201731 A1* | 8/2008 | Howcroft | H04H 60/46 725/13 |
| 2008/0271068 A1* | 10/2008 | Ou | H04N 21/4348 725/32 |
| 2009/0025025 A1* | 1/2009 | Vleck | H04L 12/66 725/14 |
| 2009/0025028 A1* | 1/2009 | Cassanova | H04N 21/4786 725/34 |
| 2009/0144201 A1* | 6/2009 | Gierkink | G06Q 20/382 705/64 |
| 2009/0187939 A1* | 7/2009 | Lajoie | H04N 21/44016 725/34 |
| 2009/0325713 A1* | 12/2009 | Cansler | H04N 21/25891 463/42 |
| 2010/0050083 A1* | 2/2010 | Axen | G11B 27/031 715/726 |
| 2010/0054134 A1* | 3/2010 | Briand | H04L 43/50 370/241 |
| 2011/0145869 A1* | 6/2011 | Rahman | H04N 21/4383 725/87 |
| 2012/0233640 A1* | 9/2012 | Odryna | H04N 21/4622 725/45 |
| 2012/0297406 A1* | 11/2012 | Bartholomay | G06Q 30/0241 725/9 |
| 2013/0055309 A1* | 2/2013 | Dittus | G06Q 30/0269 725/35 |
| 2014/0244488 A1* | 8/2014 | Kim | G06Q 20/123 705/39 |
| 2014/0281489 A1* | 9/2014 | Peterka | H04L 63/0464 713/153 |
| 2014/0375896 A1* | 12/2014 | Friedman | G06F 1/1626 348/734 |
| 2015/0304733 A1* | 10/2015 | Mozell | H04N 21/632 725/37 |
| 2016/0125471 A1* | 5/2016 | Hsu | G06Q 30/0269 705/14.66 |
| 2016/0241911 A1* | 8/2016 | Shah | H04N 21/64322 |

* cited by examiner

TARGETED CONTENT DELIVERY

BACKGROUND

Customer devices (e.g., television set-top boxes (STBs), or the like) can receive both traditional television signals, via a dedicated connection, and Internet protocol (IP)-based data services, via an Internet connection. Video content delivered to the customer devices via an IP-based packet network can be referred to as over-the-top (OTT) delivery. OTT video content can include, for example, live content streams, pre-recorded video content (e.g., television episodes, movies, or the like), and content associated with video portals provided by content providers.

DETAILED DESCRIPTION OF PREFERRED EMBODIMENTS

Figure 1A:
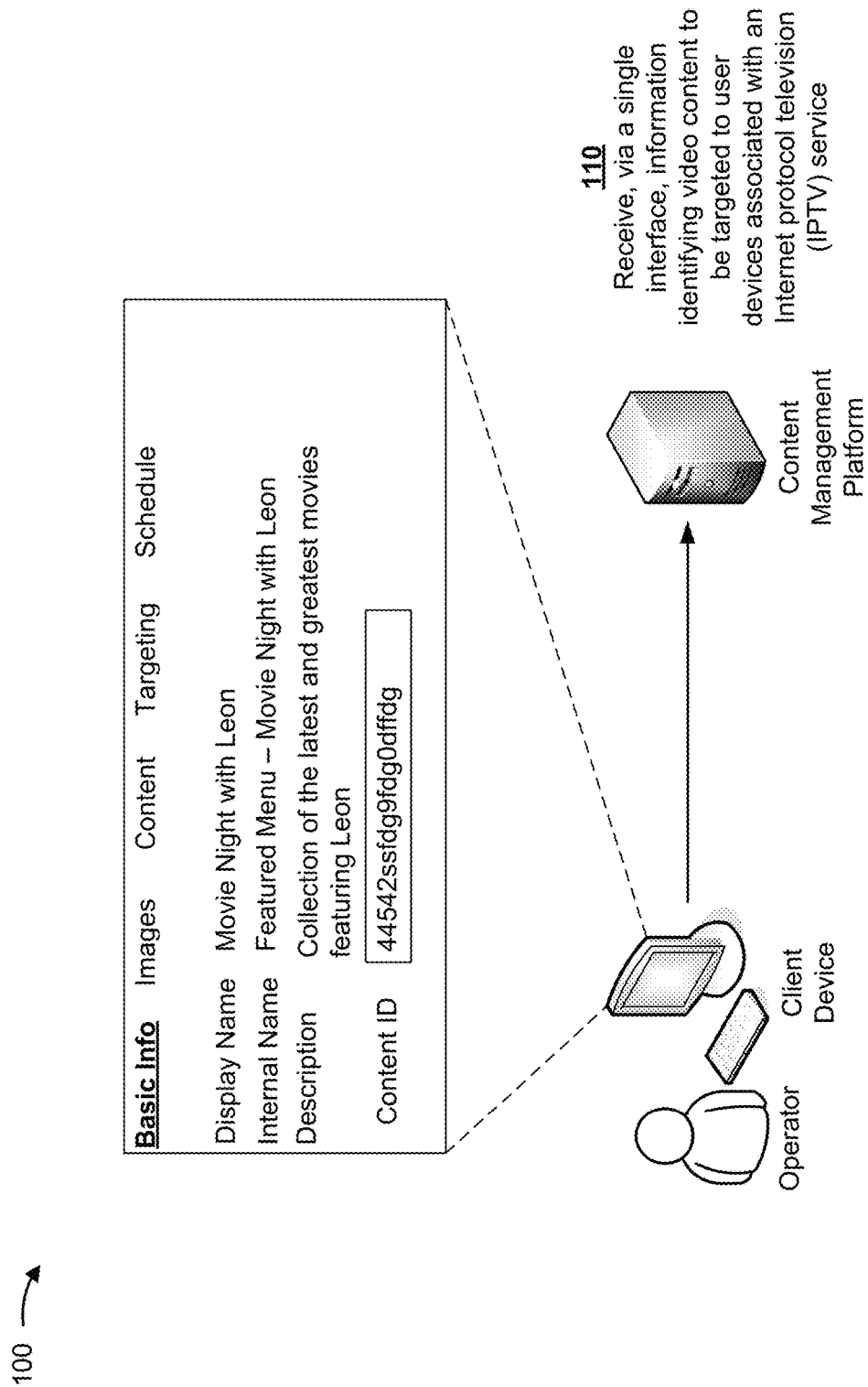
FIGS. 1A-1G are diagrams of an overview of an example implementation described herein.

The following detailed description of example implementations refers to the accompanying drawings. The same reference numbers in different drawings can identify the same or similar elements.

A telecommunications service provider can provide Internet Protocol Television (IPTV) services to subscribers. As part of offering the IPTV services, acquisition and/or encoding devices (e.g., server devices) can receive signal streams from various content sources (e.g., signal streams associated with streaming media content, such as video content).

Additionally, the acquisition and/or encoding devices can transcode the signals using a particular codec, such as a Motion Pictures Experts Group (MPEG) codec (e.g., MPEG-4), and can partition the streaming media content into multiple files (e.g., transport stream (TS) files). Additionally, origin servers and/or content delivery network (CDN) servers can store (e.g., cache) the files associated with the streaming media content, thereby enabling user devices to request and receive the streaming media content (e.g., using IP infrastructure). Further, the above devices can need to transcode and distribute streaming media content for a wide variety of content sources (e.g., channels).

A content curation team might configure particular information identifying video content to be provided to user devices as part of an IPTV service. For example, the content curation team can configure particular information identifying video content, such as information identifying movies, television shows, advertisements, promotions, television series, live events, sporting events, or the like, to be provided to user devices. In this way, the user devices can provide, for display, the information identifying video content to permit a user to select particular video content for playback, to subscribe to the video content, to purchase the video content, or the like.

However, in some cases, information identifying video content can be provided to user devices that are incapable of providing the video content for playback, to user devices that are associated with a geolocation to which the video content is not applicable, to user devices that are associated with user accounts that are not subscribed to the video content or are restricted from providing the video content for playback, to user devices that are not likely to subscribe to or provide the video content for playback, and/or the like. As such, network resources are consumed by providing inapplicable information identifying video content to user devices.

Some implementations described herein provide a content management platform that permits an operator to access, using a client device, a single interface of the content management platform, and configure, using the single interface, information identifying video content to be targeted to user devices. In this way, a user device can receive targeted information that is associated with video content that is capable of being provided for playback via the user device, is applicable to a geolocation of the user device, is subscribed to and/or not restricted from being provided for playback, is capable of being subscribed to and/or is likely to be of interest to a user associated with the user device, and/or the like.

In this way, some implementations described herein conserve network resources and/or conserve processor and/or memory resources of a user device by reducing an amount of inapplicable information identifying video content that is provided to the user device. Additionally, some implementations described herein conserve processor and/or memory resources of a user device by reducing an amount of user-initiated navigation of a guide, menu, screen, or the like, associated with a content search. For example, by providing information identifying video content that is likely to interest a user, some implementations described herein reduce a need of the user to perform manual content searches.

FIGS. 1A-1G are diagrams of an overview of an example implementation 100 described herein. As shown in FIGS. 1A-1G, example implementation 100 can include a content management platform that can communicate with a client device operated by an operator and/or a user device used by a user.

As shown in FIG. 1A, and by reference number 110, the content management platform can receive, via a single interface, information identifying video content to be targeted to user devices associated with an Internet protocol television (IPTV) service. For example, the operator might be configuring information, associated with a set of movies, to be provided to user devices as part of the IPTV service. In this case, the information identifying video content can refer to information that identifies the set of movies. In other words, the operator might be configuring an advertisement, for the set of movies, that is to be provided to user devices. While the information identifying video content is depicted as a set of movies, it should be understood that the information identifying video content can correspond to video on demand (VOD) content, live content, premium content, or the like, and/or any combination of content.

The content management platform can provide content management as a service (e.g., CMaaS). As part of the CMaaS, the content management platform can provide, to the client device, information that permits the client device to access a single interface of the content management platform. The single interface can permit the client device (e.g., which might have received an input from an operator) to perform content management as part of the IPTV service.

As shown in FIG. 1A, the display name can refer to a description, of the information that identifies the set of movies, that is capable of being provided, for display, by user devices. The internal name can refer to a description that is to be provided, for display, by client devices that are utilizing the CMaaS to perform targeted content curation and/or delivery management. The description can refer to a description, of the information that identifies the set of movies, that is capable of being displayed by user devices. The content identifier can refer to a unique identifier of the information that identifies the set of movies.

Figure 1B:
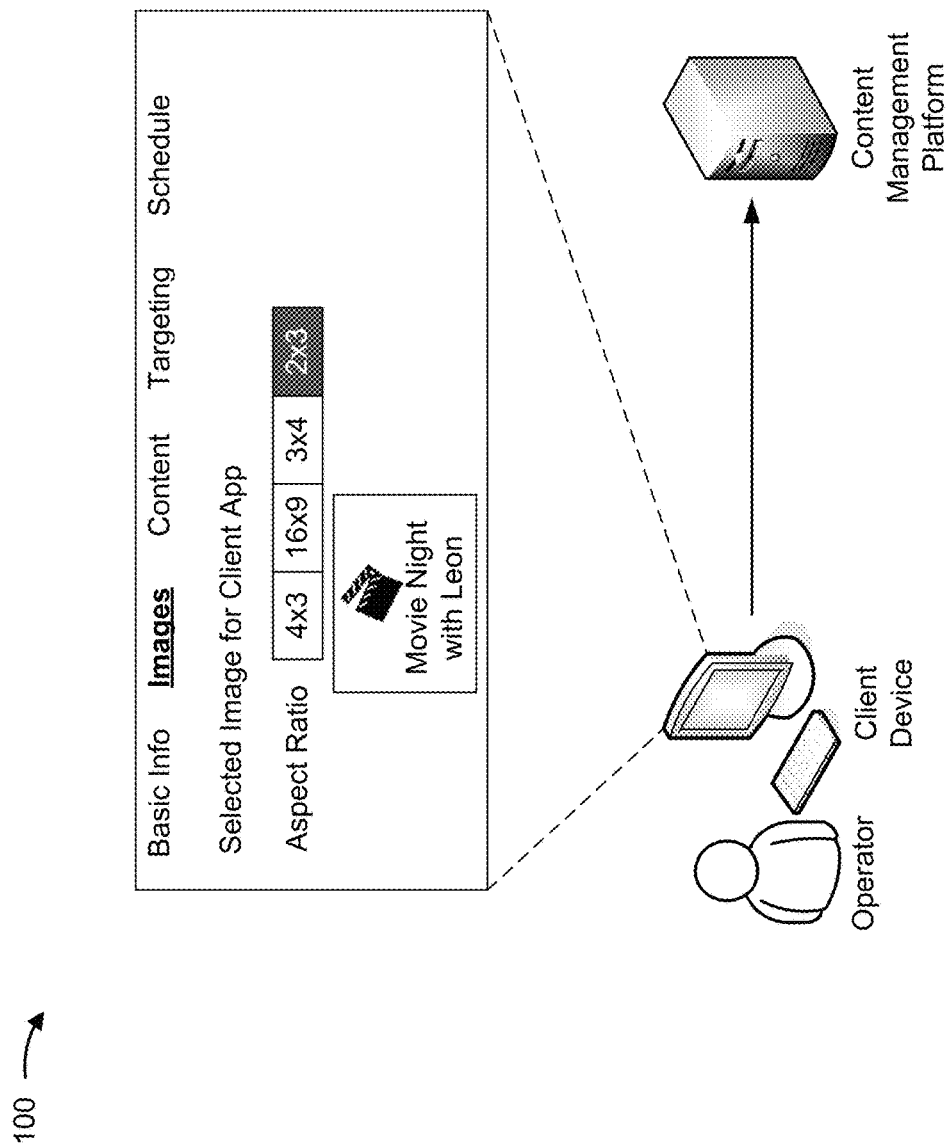

As shown in FIG. 1B, the content management platform can receive information associated with an image (or a set of images) that is to be provided, for display, by user devices in association with the information that identifies the set of movies. For example, a user device can provide the image for display in association with an IPTV application. In some implementations, a user can, using a user device, interact (e.g., select) with the image, and the user device can provide, for display, information that identifies the set of movies, information that identifies scheduled airing times of the set of movies, information that permits the user to rent or purchase a movie, and/or the like. In some implementations, and as described in more detail elsewhere herein, the content management platform can receive a set of images that might be targeted to particular types of user devices, particular demographic information, particular geolocations, or the like. For example, the content management platform can receive information associated with different images, images including different resolutions, or the like, that might be targeted to user devices.

Figure 1C:
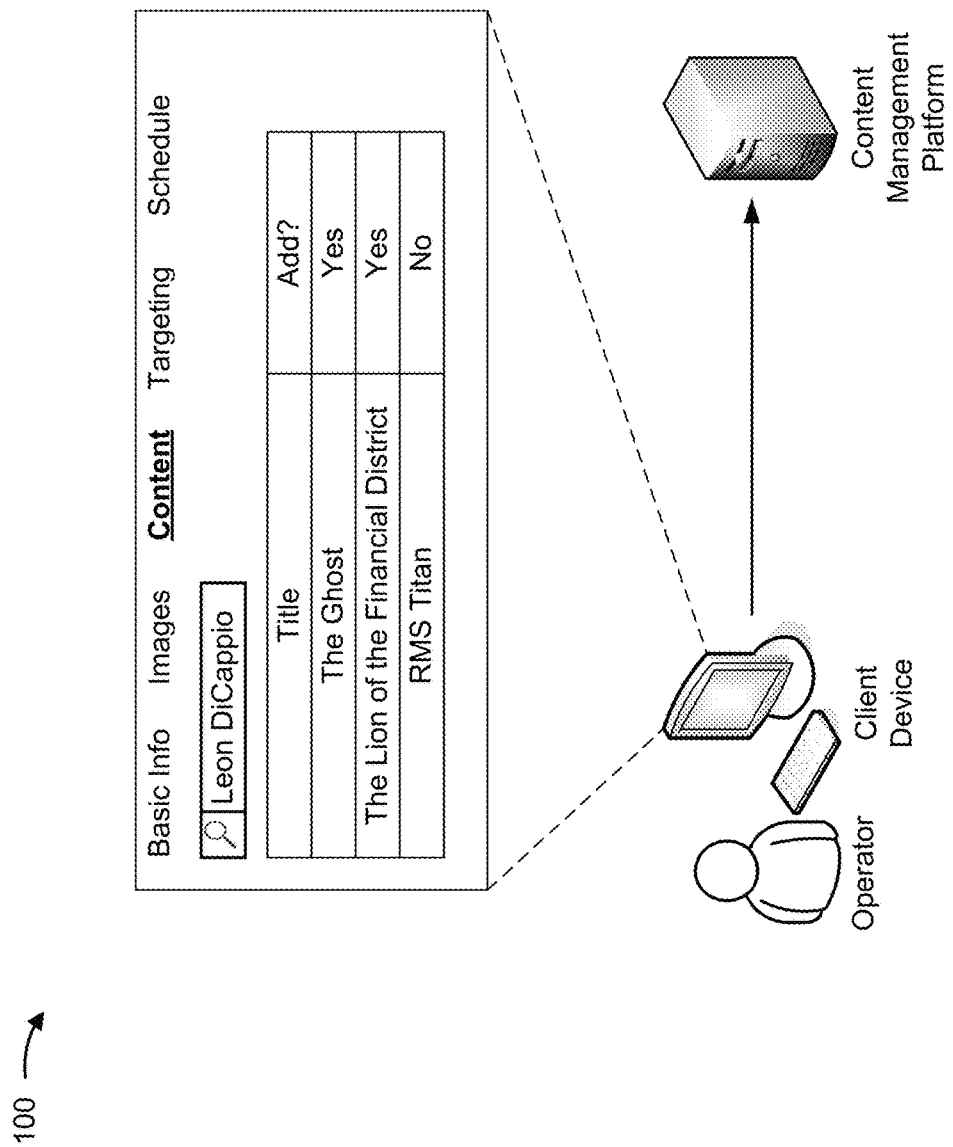

As shown in FIG. 1C, the content management platform can receive information that identifies particular movies to be added to the set of movies. As shown, the operator can cause the content management platform to perform a search for content that includes a particular actor. Based on the search, the content management platform can provide, to the client device, information that identifies particular movies that include the particular actor. As shown, the operator can select particular movies to add to the set of movies. As described in more detail elsewhere herein, the content management platform can search for content using other types of metadata associated with content, using a rule that is configured by an operator, or the like.

Figure 1D:
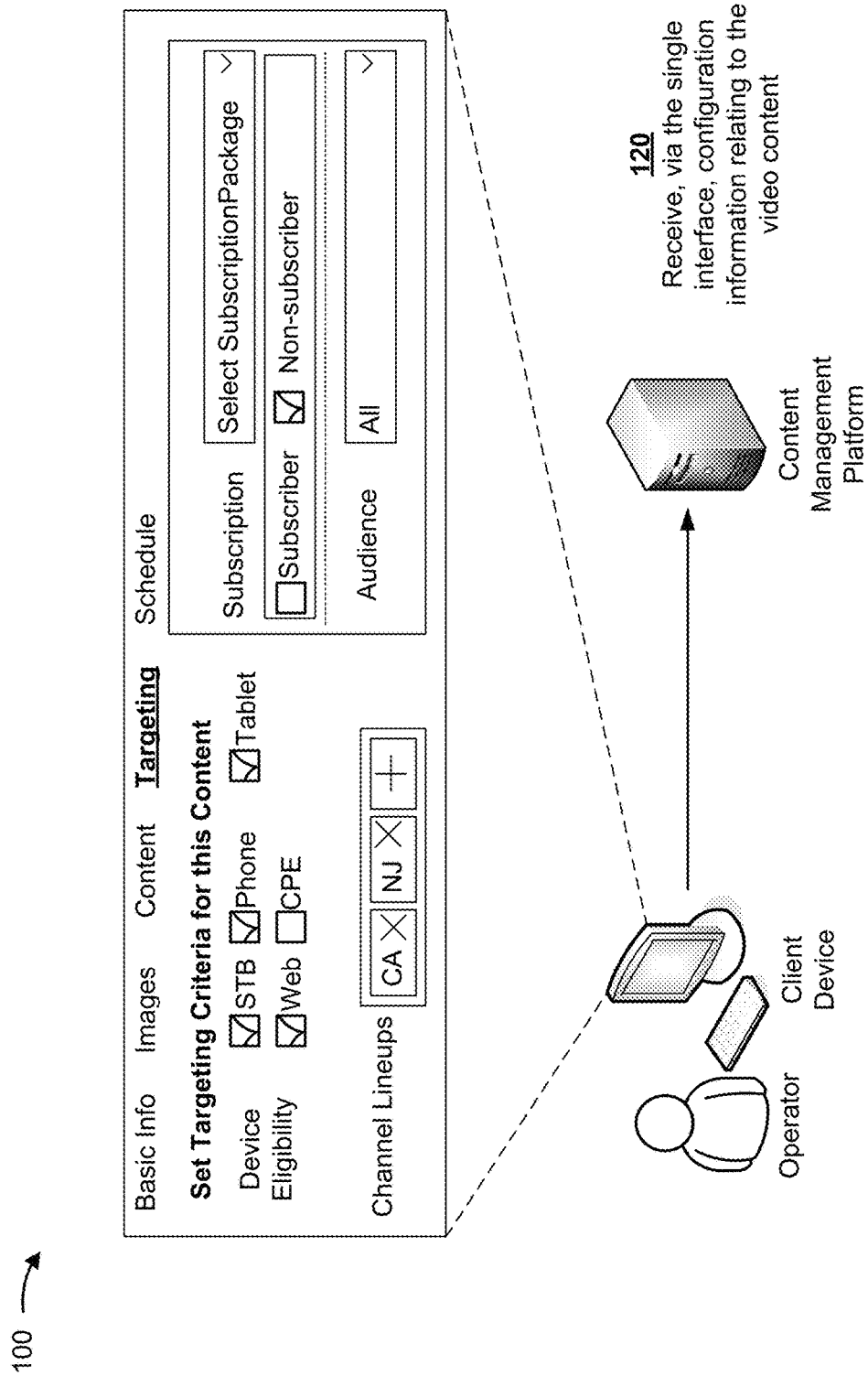

As shown in FIG. 1D, and by reference number 120, the content management platform can receive, via the single interface, configuration information relating to the video content. For example, the configuration information can include information that is capable of being used by the content management platform to generate targeted information to provide to user devices. Targeted information can refer to information that is provided to a user device based on particular information associated with the user device and/or a set of accounts or profiles associated with the user device (e.g., a device type, an access network connectivity, subscription information, or the like).

As shown, the device eligibility information can identify particular types of devices (e.g., set-top boxes, smartphones, tablet computers, devices executing web-based IPTV applications, or the like) that are eligible to receive the information associated with the set of movies. In this way, an operator can, using a client device, manage content via a single interface provided by the content management platform. In other words, the operator can perform content management using a single interface that is provided by the content management platform instead of configuring content, to be provided to different types of devices that are associated with different types of access network connectivity, using different services, or the like.

The subscription information can refer to information that identifies particular subscription statuses of user devices that are to receive the information associated with the set of movies. For example, as shown, the selection of "non-subscriber" can identify that user devices, that are associated with user accounts that are not subscribed to a package, a channel, or the like, are to receive the information associated with the set of movies.

The channel lineup information can identify particular channel lineups that are to include the information associated with the set of movies. For example, user devices that receive the identified channel lineups (e.g., California ("CA") and New Jersey ("NJ")) might receive the information associated with the set of movies, whereas other user devices that do not receive the particular channel lineups will not receive the information associated with the set of movies.

Figure 1E:
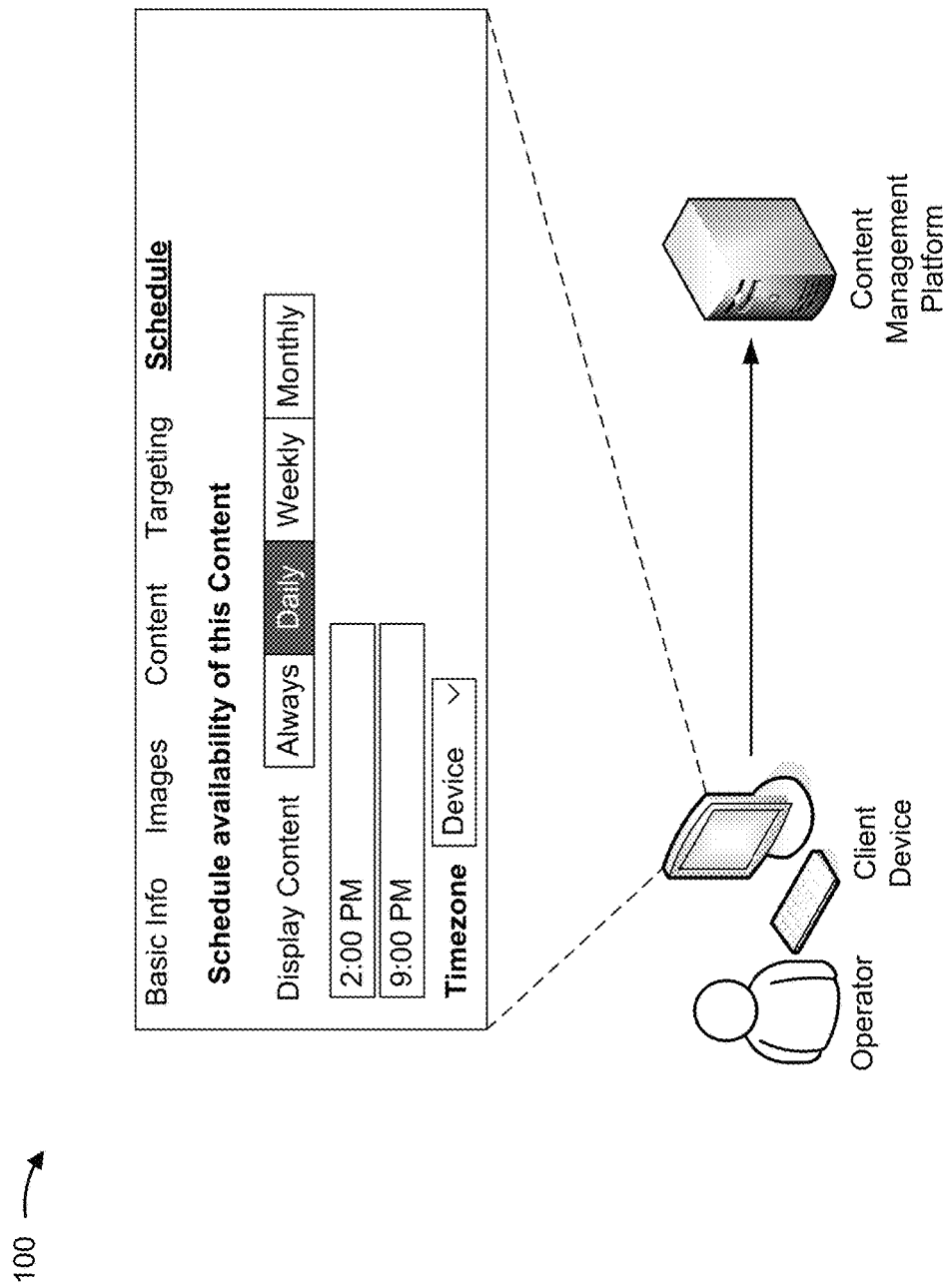

As shown in FIG. 1E, the content management platform can receive, from the client device, information that identifies a time frame for which the targeted content is to be provided to user devices. For example, as shown, the information associated with the set of movies (e.g., that was configured by the operator) is scheduled to be provided, for display by user devices, daily between 2:00 PM and 9:00 PM. In other words, the promotion for the set of movies might be provided to user devices in association with the time frame. Put another way, the set of movies might be available to be provided for playback by user devices outside of the time frame, while the targeted content (e.g., that was curated by the operator) might not be available to be provided for display outside of the time frame.

Figure 1F:
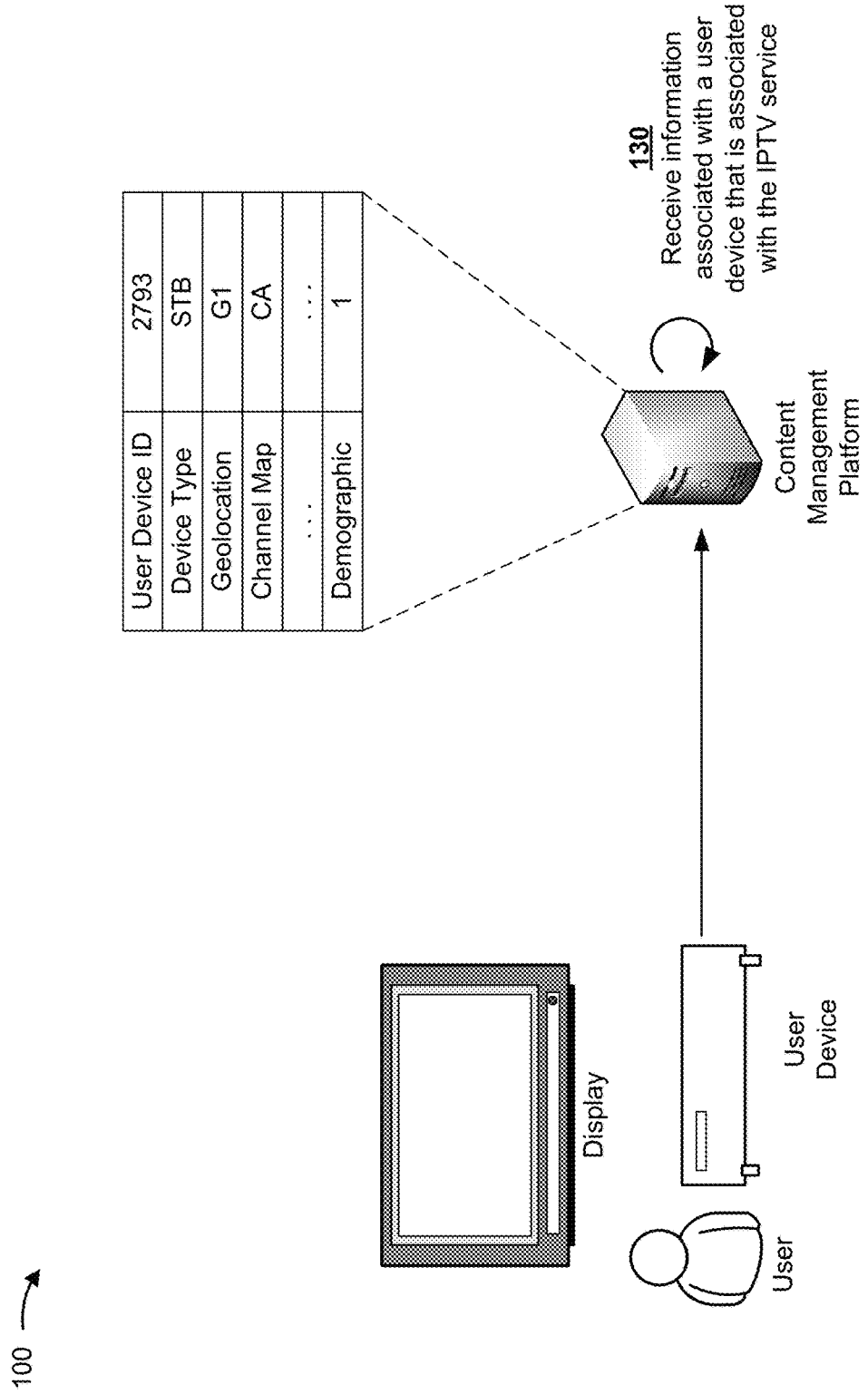

As shown in FIG. 1F, and by reference number 130, the content management platform can receive information associated with a user device that is associated with the IPTV service. For example, the user device can provide, to the content management platform, a request for targeted information. As shown, the content management platform can identify a user device identifier of the user device (e.g., 2793), a device type of the user device (e.g., a set-top box), a geolocation of the user device (e.g., G1), a channel map associated with the user device (e.g., CA), and demographic information associated with a user of a user account (e.g., demographic 1).

The content management platform can receive the information associated with the user device based on a request. For example, the user device can provide, to the content management platform, a request for targeted information relating to video content. Additionally, or alternatively, the content management platform can identify, using stored information, the information associated with the user device.

Figure 1G:
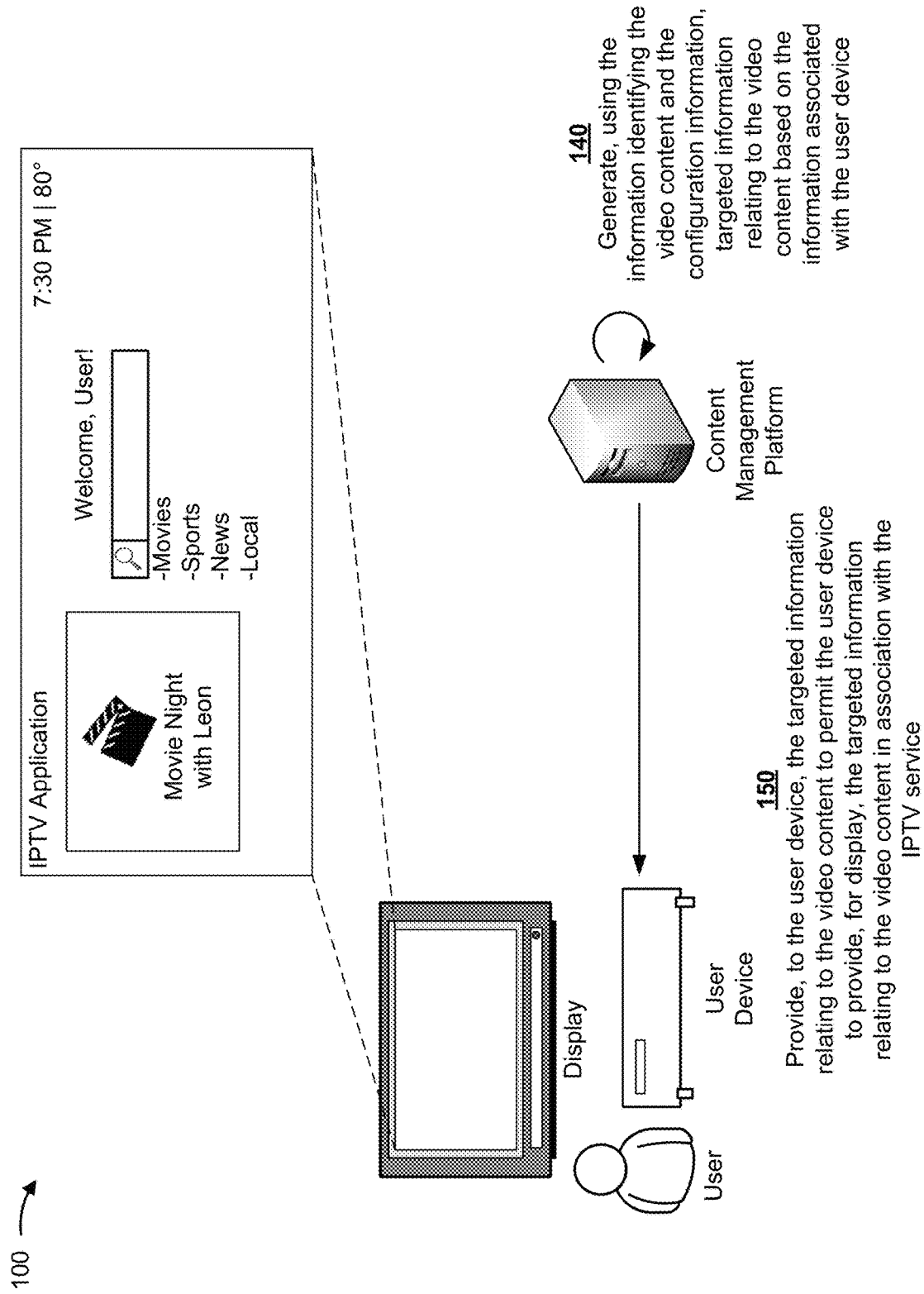

As shown in FIG. 1G, and by reference number 140, the content management platform can generate, using the information identifying video content and the configuration information, targeted information relating to the video content based on the information associated with the user device. For example, the content management platform can, using the information associated with the user device, generate targeted information based on the information identifying video content. In other words, the content management platform can compare information, associated with the user device, and configuration information associated with the video content. Additionally, the content management platform can generate targeted information based on the comparison. For example, the content management platform can determine that the user device is to receive the information identifying the set of movies based on the user device being a set-top box, the user of the user device being associated with a particular demographic, the user device being associated with the CA (i.e., California) channel map, etc.

As further shown in FIG. 1G, and by reference number 150, the content management platform can provide, to the user device, the targeted information relating to the video content to permit the user device to provide, for display, the targeted information relating to the video content in association with the IPTV service. For example, as shown, the user device can provide, for display, information associated with an IPTV application. Additionally, as shown, the user device can provide, for display, targeted information associated with the set of movies in association with the IPTV application. In this way, a user can interact with the information associated with the set of movies to identify a scheduled airing, to rent a movie, to subscribe to a channel associated with the set of movies, or the like.

As indicated above, FIGS. 1A-1G are provided merely as an example. Other examples are possible and can differ from what was described with regard to FIGS. 1A-1G.

Figure 2:
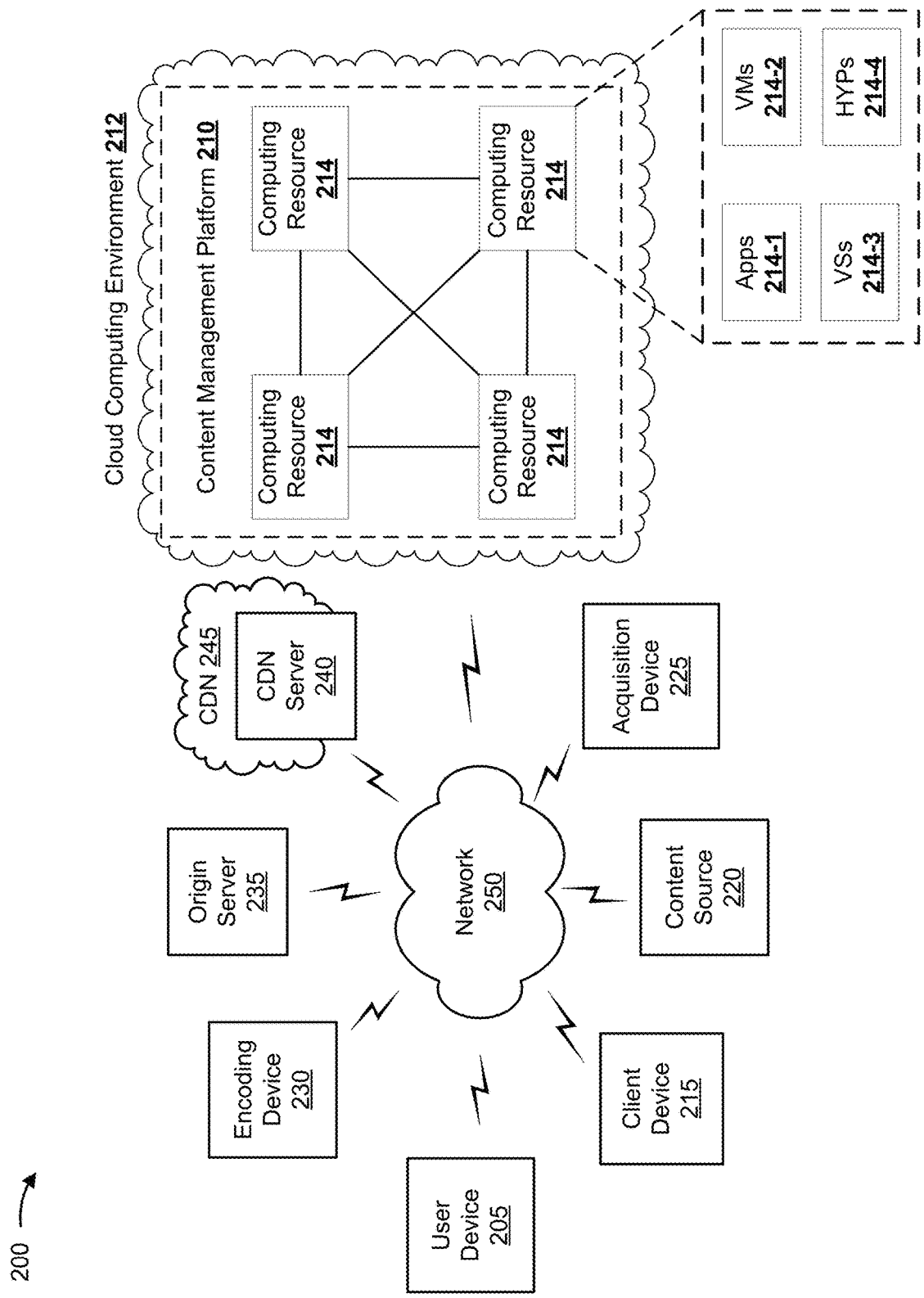
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a content management platform 210, a client device 215, a content source 220, an acquisition device 225, an encoding device 230, an origin server 235, a CDN server 240, a CDN 245, and a network 250. Devices of environment 200 can interconnect via wired connections, wireless connections, or a combination of wired and wireless connections.

User device 205 includes one or more devices capable of receiving, generating, storing, processing, and/or providing information associated with an IPTV service. For example, user device 205 can include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

Content management platform 210 includes one or more devices capable of providing content management as a service (e.g., CMaaS). In some implementations, content management platform 210 can be designed to be modular such that certain software components can be swapped in or out depending on a particular need. As such, content management platform 210 can be easily and/or quickly reconfigured for different uses.

In some implementations, as shown, content management platform 210 can be hosted in cloud computing environment 212. Notably, while implementations described herein describe content management platform 210 as being hosted in cloud computing environment 212, in some implementations, content management platform 210 might not be cloud-based (i.e., can be implemented outside of a cloud computing environment) or can be partially cloud-based.

Cloud computing environment 212 includes an environment that hosts content management platform 210. Cloud computing environment 212 can provide computation, software, data access, storage, etc. services that do not require end-user (e.g., client device 215) knowledge of a physical location and configuration of system(s) and/or device(s) that hosts content management platform 210. As shown, cloud computing environment 212 can include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 can host content management platform 210. The cloud resources can include compute instances executing in computing resource 214, storage devices provided in computing resource 214, data transfer devices provided by computing resource 214, etc. In some implementations, computing resource 214 can communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, or the like.

Application 214-1 includes one or more software applications that can be provided to or accessed by client device 215. Application 214-1 can eliminate a need to install and execute the software applications on client device 215. For example, application 214-1 can include software associated with content management platform 210 and/or any other software capable of being provided via cloud computing environment 212. In some implementations, one application 214-1 can send/receive information to/from one or more other applications 214-1, via virtual machine 214-2.

Virtual machine 214-2 includes a software implementation of a machine (e.g., a computer) that executes programs like a physical machine. Virtual machine 214-2 can be either a system virtual machine or a process virtual machine, depending upon use and degree of correspondence to any real machine by virtual machine 214-2. A system virtual machine can provide a complete system platform that supports execution of a complete operating system ("OS"). A process virtual machine can execute a single program, and can support a single process. In some implementations, virtual machine 214-2 can execute on behalf of a user (e.g., client device 215), and can manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 214-4 can provide hardware virtualization techniques that allow multiple operating systems (e.g., "guest operating systems") to execute concurrently on a host computer, such as computing resource 214. Hypervisor 214-4 can present a virtual operating platform to the guest operating systems, and can manage the execution of the guest operating systems. Multiple instances of a variety of operating systems can share virtualized hardware resources.

Client device 215 includes one or more devices capable of receiving, generating, storing, processing, and/or providing information associated with a content management service. For example, client device 215 can include a device, such as a mobile phone (e.g., a smart phone, a radiotelephone, etc.), a laptop computer, a tablet computer, a handheld computer, or a similar type of device.

Content source 220 includes one or more devices capable of receiving, storing, processing, and/or providing information associated with streaming media content. For example, content source 220 can include a server device or a similar device. In some implementations, content source 220 can provide a stream (e.g., a signal stream) to acquisition device 225.

Acquisition device 225 includes one or more devices capable of receiving, storing, processing, and/or providing information associated with streaming media content. For example, acquisition device 225 can include a server device or a similar device. In some implementations, acquisition device 225 can receive a stream from content source 220, and can provide the stream to encoding device 230.

Encoding device 230 includes one or more devices capable of receiving, storing, processing, and/or providing information associated with streaming media content. For example, encoding device 230 can include a server device or a similar device. In some implementations, encoding device 230 can encode a stream, can partition the stream into segments, and can provide streaming media content (e.g., files associated with the segments of the streaming media content) to origin server 235.

Origin Server 235 includes one or more devices capable of receiving, storing, processing, and/or providing streaming media content (e.g., one or more segments of streaming media content). For example, origin server 235 can include a storage device, a server, or a similar device. In some implementations, origin server 235 can store streaming media content, and/or can provide the streaming media content to CDN servers 240 (e.g., for distribution to user devices 205).

CDN server 240 includes one or more devices capable of receiving, storing, processing, and/or providing information associated with streaming media content. For example, CDN server 240 can include a server device or a similar device. In some implementations, CDN server 240 can receive streaming media content from origin server 235, can store the streaming media content, and can provide the streaming media content to user device 205.

CDN 245 includes one or more wired and/or wireless networks of devices that are capable of receiving, storing, processing, and/or providing streaming media content (e.g., one or more segments of the streaming media content). CDN 245 can include, for example, servers, data centers, or the like.

Network 250 includes one or more wired and/or wireless networks. For example, network 250 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
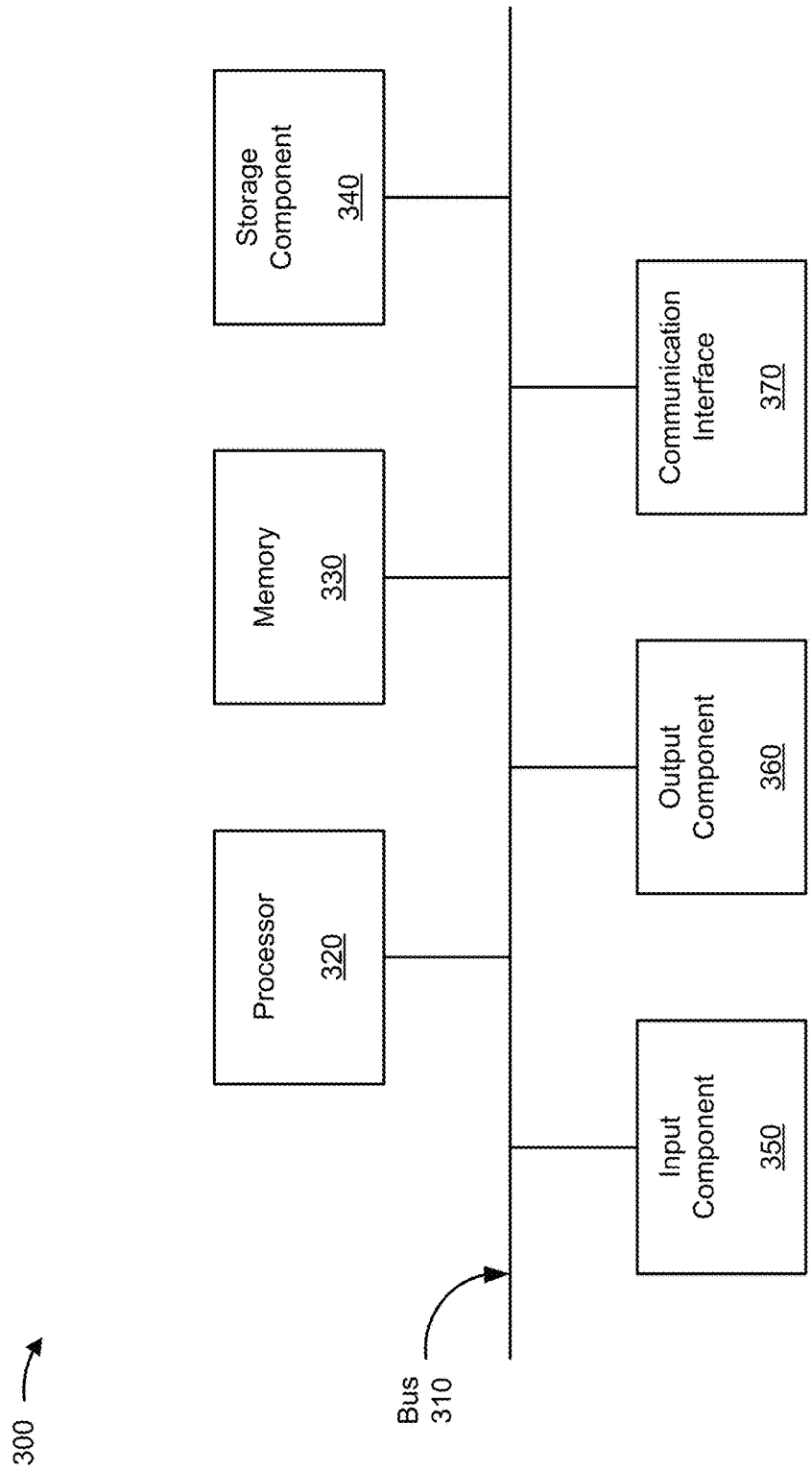
FIG. 3 is a diagram of example components of one or more devices of FIG. 2.

FIG. 3 is a diagram of example components of a device 300. Device 300 can correspond to user device 205, content management platform 210, client device 215, content source 220, acquisition device 225, encoding device 230, origin server 235, and/or CDN server 240. In some implementations, user device 205, content management platform 210, client device 215, content source 220, acquisition device 225, encoding device 230, origin server 235, and/or CDN server 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
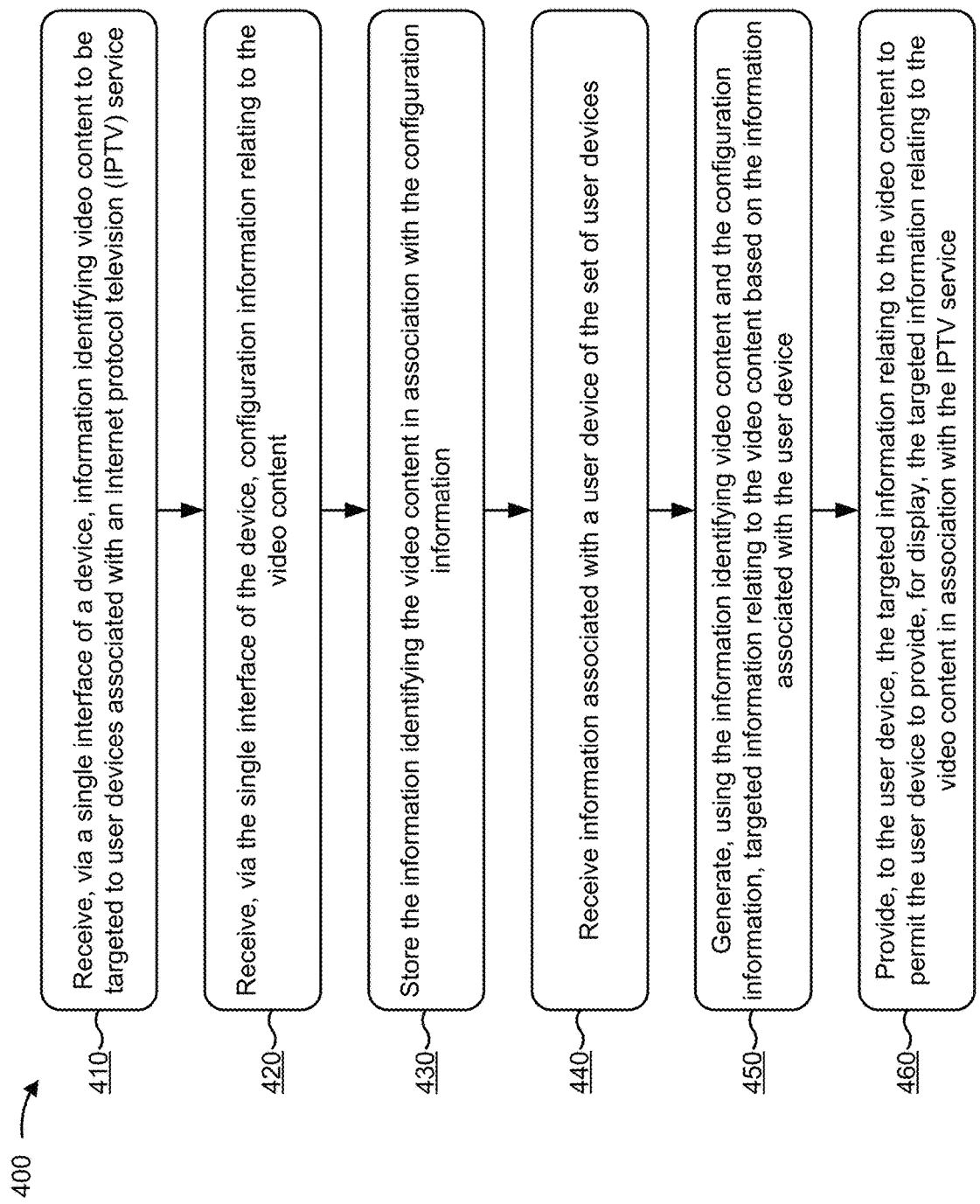
FIG. 4 is a flow chart of an example process for performing targeted content delivery.

FIG. 4 is a flow chart of an example process 400 for performing targeted content delivery. In some implementations, one or more process blocks of FIG. 4 can be performed by content management platform 210. In some implementations, one or more process blocks of FIG. 4 can be performed by another device or a group of devices separate from or including content management platform 210 such as user device 205, client device 215, content source 220, acquisition device 225, encoding device 230, origin server 235, and/or CDN server 240.

As shown in FIG. 4, process 400 can include receiving, via a single interface of a device, information identifying video content to be targeted to user devices associated with an Internet protocol television (IPTV) service (block 410). For example, content management platform 210 can receive, via a single interface of content management platform 210, information identifying video content that is to be targeted to user devices 205 in association with an IPTV service.

In some implementations, content management platform 210 can provide content management as a service (CMaaS), and permit client devices 215 to provide information identifying video content to be targeted to user devices 205 associated with an IPTV service and/or configuration information relating to the video content as part of the CMaaS. In some implementations, content management platform 210 can provide, to client device 215, information that permits client device 215 to provide, for display, a single interface via which information identifying video content and/or configuration information relating to the video content can be input. In other words, an operator of client device 215 can interact with the single interface that is being provided for display by client device 215 as part of the CMaaS.

In some implementations, content management platform 210 can receive, from client device 215 and via the single interface, information identifying video content to be targeted to user devices 205. In some implementations, the information identifying video content can refer to information that is capable of being provided for display, for playback, or the like, in association with an IPTV service. For example, the information identifying video content can include an image, a video, an advertisement, audio, schedule information, menu information, guide information, a promotion, or the like. In some implementations, and as described elsewhere herein, the information identifying video content can be targeted to user devices 205 based on configuration information and information associated with user devices 205.

In some implementations, content management platform 210 can receive, from client device 215 and via the single interface, information associated with particular information identifying video content that is to be targeted to user device 205. For example, an operator can interact with client device 215 to select particular information identifying video content that is to be targeted to user device 205. As an example, assume that an operator wishes to provide, to user device 205, particular information identifying video content associated with a particular movie, a particular episode of a television show, a particular advertisement, a particular promotion for a live event, etc. In this case, client device 215 can provide, to content management platform 210 and via the single interface, information that identifies the particular movie, the particular episode of a television show, the particular advertisement, the particular promotion for a live event, etc.

In some implementations, content management platform 210 can receive, from client device 215 and via the single interface, information associated with a set of parameters. Additionally, or alternatively, content management platform 210 can identify, using the set of parameters, information identifying video content that is to be targeted to user device 205. For example, a parameter can refer to a genre, a television series, an entity, a content source, a content owner, an actress, an actor, a collection of movies, a theme, an event, a sports team, or the like. As an example, assume that content management platform 210 receives information that identifies a particular parameter that is to be used to identify information identifying video content (e.g., an actress). In this case, content management platform 210 can identify content information that includes the actress (e.g., movies involving the actress, televisions episodes involving the actress, or the like). In some implementations, an operator can configure a rule that includes a set of parameters, and content management platform 210 can identify content using the rule.

In this way, some implementations described herein reduce an amount of configuration of information identifying video content by enabling content management platform 210 to receive information that identifies a set of parameters, and then identify information identifying video content based on the set of parameters as compared to situations where content management platform 210 is provided with discrete information identifying video content. In other words, content management platform 210 can receive information associated with a set of parameters once, and then determine information identifying video content using the set of parameters multiple times, thereby reducing an amount of manual configuration.

As further shown in FIG. 4, process 400 can include receiving, via the single interface of the device, configuration information relating to the video content (block 420). For example, content management platform 210 can receive, from client device 215 and via the single interface, configuration information relating to the video content. In some implementations, content management platform 210 can use the configuration information to determine information identifying video content that is to be targeted to user devices 205.

By utilizing configuration information, some implementations described herein conserve network resources and/or processor and/or memory resources of user devices 205, content management platform 210, CDN servers 240, etc., by providing information identifying video content that is capable, eligible, etc. of being provided for playback by user devices 205, by reducing an amount of user interaction with user device 205 (e.g., associated with menu navigation, or the like), by providing information identifying video content that is likely to be selected for playback, by providing information identifying video content that is eligible to be subscribed to by user device 205, or the like.

In some implementations, configuration information can include a service identifier that identifies a particular service. For example, a service identifier can identify an IPTV service, a streaming media service, a content service, or the like. In some implementations, a service identifier can identify a particular service for which the information identifying video content is to be provided.

In this way, an operator of client device 215 can select multiple services, and configure the information identifying video content for usage in association with the multiple services. Thereby, some implementations described herein reduce an amount of time and an amount of configuration associated with content management. In other words, instead of configuring information identifying video content ten separate times for ten different services, an operator can configure the information identifying video content once for usage in association with the ten different services. Thereby, some implementations described herein conserve network resources and processor and/or memory resources of devices associated with content management.

In some implementations, configuration information can include a service area identifier. For example, a service area identifier can include a region identifier, a local franchising authority (LFA) identifier, a zip code identifier, a county identifier, a metropolitan statistical area (MSA) identifier, a core based statistical area (CBSA) identifier, a common language location identifier (CLLI), or the like. In some implementations, a service area identifier can identify a particular service area (e.g., a set of geolocations) to which information identifying video content is applicable. In other words, user devices 205 that are located within the service area might be eligible to receive the information identifying video content, whereas other user devices 205 that are not located within the service area will not be eligible to receive the information identifying video content.

In some implementations, configuration information can include device eligibility information. For example, device eligibility information can identify whether particular types of user devices 205 (e.g., set-top boxes, mobile phones, tablet computers, desktop computers, or the like) are eligible to receive the information identifying video content, and provide the information identifying video content for display. In some implementations, the device eligibility information can identify whether cellular devices and/or non-cellular devices are eligible to receive the information identifying video content. Thus, the device eligibility information can identify particular types of devices that receive video content via different types of content delivery networks (e.g., a cellular network, a non-cellular wireless network, a wired network, a cable television network, or the like).

In some implementations, an operator can interact with client device 215, which might be providing information associated with the single interface for display, to select particular types of user devices 205 that are eligible to receive the information identifying video content. In this way, the information identifying video content can be targeted to particular device types that are capable of providing the information identifying video content and/or the video content for playback, for which the information identifying video content and/or the video content was designed for playback, etc.

In some implementations, the configuration information can include connectivity information. For example, connectivity information can identify whether a user device 205 is eligible to receive the information identifying video content, and provide the information identifying video content for playback based on an access point connectivity and/or access network connectivity of the user device 205. As an example, "in-home" eligibility can identify that a user device 205 that is connected to a customer premises equipment (CPE) is eligible to receive and provide the information identifying video content for display. As another example, "out-of-home" eligibility can identify that a user device that is connected to a radio access network (RAN), a public access network (e.g., a public Wi-Fi network, or the like), an access network that is not associated with a customer premises, or the like, is eligible to receive and provide the information identifying video content for display.

In some implementations, the configuration information can include demographic information. For example, demographic information can identify a particular demographic for which the information identifying video content is to be targeted. Additionally, or alternatively, the configuration information can include behavioral information. For example, behavioral information can identify that the information identifying video content is to be targeted to particular user devices 205 that are associated with a particular content playback history, a particular browsing history, a particular video content purchase history, or the like.

In some implementations, the configuration information can refer to subscription information. For example, subscription information can identify whether the information identifying video content requires a particular subscription, whether the information identifying video content is part of a package that requires a subscription, or the like.

As further shown in FIG. 4, process 400 can include storing the information identifying video content in association with the configuration information (block 430). For example, content management platform 210 can store, in a data structure, the information identifying video content in association with the configuration information.

In practice, content management platform 210 can receive configuration information associated with hundreds, thousands, millions, etc. of data points relating to respective information identifying video content. In some implementations, content management platform 210 can store the information identifying video content in association with the configuration information, and utilize the stored information when generating targeted information relating to the video content, as described elsewhere herein.

As further shown in FIG. 4, process 400 can include receiving information associated with a user device of the set of user devices (block 440). For example, content management platform 210 can receive information, associated with user device 205, that permits content management platform 210 to generate targeted information relating to the video content.

In some implementations, user device 205 can provide, to content management platform 210, a request for targeted information relating to the video content. For example, user device 205 can provide, to content management platform 210, a request for targeted information relating to the video content based on a time frame (e.g., periodically), based on an event (e.g., a change in geolocation of user device 205, a change in access point or access network connectivity of user device 205, or the like), based on a user interaction with user device 205 (e.g., a user activating an IPTV application on user device 205), based on a log-in process, or the like.

In some implementations, content management platform 210 can receive information associated with user device 205. For example, user device 205 can provide the information associated with user device 205 based on the request for the targeted information relating to the video content. Additionally, or alternatively, content management platform 210 can identify a memory location at which the information associated with user device 205 is stored, and retrieve the information associated with user device 205. Additionally, or alternatively, content management platform 210 can provide, to user device 205, a request for the information associated with user device 205, and receive the information based on the request. In some implementations, a user of user device 205 can configure settings associated with an IPTV service, and content management platform 210 can receive the information associated with user device 205 based on the configured settings.

In some implementations, the information associated with user device 205 can be associated with an account of user device 205. Additionally, or alternatively, the information associated with user device 205 can be associated with a set of profiles of user device 205 (e.g., associated with the account). For example, multiple users might be associated with a particular user device 205 (e.g., registered to use user device 205), and the multiple users might be associated with respective profiles. In this way, user device 205 might receive different targeted information relating to the video content based on a particular profile that is being used in association with user device 205.

In some implementations, the information associated with user device 205 can be associated with user information. For example, the user information can identify demographic information of a user, a set of interests of a user, or the like.

In some implementations, the information associated with user device 205 can be associated with behavioral information. For example, behavioral information can identify a content playback history of user device 205 (e.g., most viewed content, most frequently viewed content, least viewed content, favorited content, most recorded content, etc.). Additionally, or alternatively, behavioral information can identify a browsing history of user device 205.

Additionally, or alternatively, behavioral information can identify activity patterns associated with user device 205 (e.g., times of day at which user device 205 provides content for playback, times of day at which a particular user is logged in to an IPTV application, times of day at which user device 205 is associated with a particular geolocation, times of day at which user devices 205 is connected to a particular access network, or the like).

In some implementations, the information associated with user device 205 can include subscription information associated with an account of user device 205. For example, the subscription information can identify channels to which user device 205 is subscribed, content to which user device 205 is subscribed, services to which user device 205 is subscribed, video packages to which user device 205 is subscribed, etc.

In some implementations, the information associated with user device 205 can include restriction information. For example, restriction information can include a rating restriction (e.g., parental guidance (PG) only, PG-13 and below, etc.), an age restriction, a content type restriction, a channel restriction, a channel category restriction, a time of day restriction, a device type restriction, an access point and/or access network restriction, a geolocation restriction, or the like. Additionally, or alternatively, restriction information can include content restriction, such as a restriction regarding a particular movie, show, actress, actor, content source, event, theme, or the like.

In some implementations, the information associated with user device 205 can identify device information of user device 205. For example, the device information can identify a device type (e.g., a set-top box, a mobile phone, a tablet computer, etc.). Additionally, or alternatively, the device information can identify an operating system version, a software version, a user interface version, a screen parameter, a resolution parameter, or the like.

In some implementations, the information associated with user device 205 can include location information. For example, location information can identify a geolocation of user device 205, a service area identifier of user device 205, a geolocation of a customer premises associated with user device 205, or the like.

In some implementations, the information associated with user device 205 can include connectivity information. For example, connectivity information can identify an access point connectivity of user device 205, an access network connectivity of user device 205, or the like (e.g., whether user device 205 is connected to a customer premises equipment, whether user device 205 is connected to a radio access network, whether user device 205 is connected to a public access network, or the like).

In some implementations, the information associated with user device 205 can identify a time frame. For example, a time frame can refer to a time of day, a day of the week, a month, a season, or the like.

In this way, content management platform 210 can receive information associated with user device 205, and generate targeted information relating to the video content to provide to user device 205 based on the particular information associated with user device 205 and configuration information relating to the information identifying video content, as described below.

As further shown in FIG. 4, process 400 can include generating, using the information identifying video content and the configuration information, targeted information relating to the video content based on the information associated with the user device (block 450). For example, content management platform 210 can generate, using the information identifying video content and the configuration information, targeted information relating to the video content. In some implementations, content management platform 210 can utilize the stored information relating to the information identifying video content and configuration information when generating the targeted information relating to the video content.

In some implementations, content management platform 210 can receive the information associated with user device 205, and generate targeted information relating to the video content. For example, content management platform 210 can compare the information, associated with user device 205, and configuration information associated with the information relating to the video content. Additionally, content management platform 210 can generate targeted information relating to the video content after comparing the information.

In some implementations, content management platform 210 can generate targeted information relating to the video content based on account information, profile information, user information, behavioral information, subscription information, restriction information, device information, connectivity information, location information, time frame information, and/or the like. For example, content management platform 210 can compare the information, associated with user device 205, and the configuration information relating to the video content, and determine that user device 205 is to receive particular information identifying video content (e.g., targeted information) based on a match, a set of matches, etc. between the information associated with user device 205 and the configuration information relating to the video content.

In this way, content management platform 210 can generate the targeted information relating to the video content, and provide, to user device 205, the targeted information to permit the user device 205 to provide the targeted information for display, as described below.

As further shown in FIG. 4, process 400 can include providing, to the user device, the targeted information relating to the video content to permit the user device to provide, for display, the targeted information relating to the video content in association with the IPTV service (block 460). For example, content management platform 210 can provide, to user device 205, targeted information relating to the video content to permit user device 205 to provide, for display, the targeted information relating to the video content in association with the IPTV service.

In some implementations, user device 205 can receive the targeted information relating to the video content from content management platform 210. Additionally, user device 205 can provide, for display, the targeted information relating to the video content to permit a user to view the targeted information relating to the video content, interact with the targeted information related to the video content, cause playback of video content associated with the targeted information on user device 205 or another device associated with a user of user device 205, subscribe to video content associated with the targeted information, or the like.

Some implementations described herein permit content management platform 210 to provide targeted information relating to video content that is targeted to user device 205, that is associated with video content that is capable of being provided for playback by user device 205, that is more likely to be provided for playback by user device 205, that is applicable to a geolocation of user device 205, that is subscribed to and/or not restricted from being provided for playback, that is likely to be of interest to a user associated with user device 205, or the like.

In this way, content management platform 210 conserves processor and/or memory resources of user device 205 by reducing an amount of inapplicable information that is provided to user device 205. Content management platform 210 also conserves processor and/or memory resources of user device 205 by reducing an amount of user-initiated navigation of a guide, menu, screen, or the like, associated with content searching, screen navigation, or the like.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations described herein conserve processor and/or memory resources of content management devices by reducing an amount of configuration and an amount of time associated with performing content management. For example, a content management platform can provide, to a client device, information that permits configuration of targeted content provisioning via a single interface. For example, a network operator can interact with a client device to configure information relating to targeted content provisioning via a single interface instead of configuring information relating to targeted content provisioning using multiple services, multiple interfaces, or the like.

Additionally, some implementations described herein provide a content management platform to receive the configuration information, and provide to user devices, targeted information relating to the video content based on user device specific information. In this way, user devices that are associated with different IPTV services, different geolocations, different device types, different subscriptions, different content restrictions, different access network connectivity, etc. can receive targeted information that is generated by the content management platform based on the configuration information.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, or the like). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
 receive, via a single interface of the device, information identifying video content to be targeted to a set of user devices associated with an Internet protocol television (IPTV) service;
 receive, via the single interface of the device, configuration information relating to the video content,
  the configuration information including:
   information identifying one or more device types,
    the one or more device types being selected from a group including:
     a set-top box,
     a cellular device, and
     a non-cellular device,
   information associated with one or more video subscription packages, and
   information identifying whether the one or more device types are eligible to receive the information identifying the video content;
 store the information identifying the video content in association with the configuration information;
 receive information associated with a user device of the set of user devices,
  the information associated with the user device including a request for targeted information relating to the video content,
   the request for targeted information being based on a change in access network connectivity of the user device, and
  the information associated with the user device further including information associated with an access network restriction;
 generate, using the information identifying the video content, the targeted information relating to the video content based on comparing the information associated with the user device and the configuration information and based on the information associated with the access network restriction; and
 provide, to the user device, the targeted information relating to the video content to permit the user device to provide, for display, the targeted information relating to the video content in association with the IPTV service.

2. The device of claim 1, where the one or more processors are further to:
 receive information that identifies a device type, of the one or more device types, associated with the user device; and
 where the one or more processors, when generating the targeted information, are to:
  generate the targeted information based on the information that identifies the device type associated with the user device.

3. The device of claim 1, where the one or more processors are further to:
 receive information that identifies a geolocation associated with the user device; and
 where the one or more processors, when generating the targeted information, are to:
  generate the targeted information based on the information that identifies the geolocation associated with the user device.

4. The device of claim 1, where the one or more processors are further to:
 receive information that identifies a time frame associated with the information identifying the video content; and
 where the one or more processors, when providing the targeted information, are to:
  provide the targeted information based on the information that identifies the time frame.

5. The device of claim 1, where the one or more processors are further to:
 receive information that identifies demographic information of an account associated with the user device; and
 where the one or more processors, when generating the targeted information, are to:
  generate the targeted information based on the information that identifies the demographic information.

6. The device of claim 1, where the one or more processors are further to:
 receive information that identifies a set of parameters to be used to identify the information identifying the video content to be targeted to the set of user devices;
 identify the information identifying the video content using the set of parameters; and
 where the one or more processors, when providing the targeted information relating to the video content, are to:

provide the targeted information after identifying the information identifying the video content.

7. The device of claim 1, where the one or more processors are further to:
receive information that identifies an access network connectivity associated with the user device; and
where the one or more processors, when generating the targeted information, are to:
generate the targeted information based on the information that identifies the access network connectivity associated with the user device.

8. A non-transitory computer-readable medium storing instructions, the instructions comprising:
one or more instructions that, when executed by one or more processors of a device, cause the one or more processors to:
receive, via a single interface of the device, information identifying video content to be targeted to a set of user devices associated with an Internet protocol television (IPTV) service;
receive, via the single interface of the device, configuration information relating to the video content,
the configuration information including:
information identifying one or more device types,
the one or more device types being selected from a group including at least:
a cellular device, and
a non-cellular device, and
information identifying whether the one or more device types are eligible to receive the information identifying the video content;
store the information identifying the video content in association with the configuration information;
receive information associated with a user device of the set of user devices,
the information associated with the user device including a request for targeted information relating to the video content,
the request for targeted information being based on a change in access network connectivity of the user device, and
the information associated with the user device further including information associated with an access network restriction;
generate, using the information identifying the video content, the targeted information relating to the video content based on comparing the information associated with the user device and the configuration information and based on the information associated with the access network restriction; and
provide, to the user device, the targeted information relating to the video content to permit the user device to provide, for display, the targeted information relating to the video content in association with the IPTV service.

9. The non-transitory computer-readable medium of claim 8, where the one or more instructions, when executed by the one or more processors, further cause the one or more processors to:
receive information that identifies a device type, of the one or more device types, associated with the user device; and
where the one or more instructions, that cause the one or more processors to generate the targeted information, cause the one or more processors to:
generate the targeted information based on the information that identifies the device type associated with the user device.

10. The non-transitory computer-readable medium of claim 8, where the one or more instructions, when executed by the one or more processors, further cause the one or more processors to:
receive information that identifies a service area associated with the user device; and
where the one or more instructions, that cause the one or more processors to generate the targeted information, cause the one or more processors to:
generate the targeted information based on the information that identifies the service area associated with the user device.

11. The non-transitory computer-readable medium of claim 8, where the one or more instructions, when executed by the one or more processors, further cause the one or more processors to:
receive information that identifies subscription information associated with the user device; and
where the one or more instructions, that cause the one or more processors to generate the targeted information, cause the one or more processors to:
generate the targeted information based on the information that identifies the subscription information associated with the user device.

12. The non-transitory computer-readable medium of claim 8, where the one or more instructions, when executed by the one or more processors, further cause the one or more processors to:
receive information that identifies a playback history associated with the user device; and
where the one or more instructions, that cause the one or more processors to generate the targeted information, cause the one or more processors to:
generate the targeted information based on the information that identifies the playback history associated with the user device.

13. The non-transitory computer-readable medium of claim 8, where the one or more instructions, when executed by the one or more processors, further cause the one or more processors to:
receive information that identifies an access point connectivity associated with the user device; and
where the one or more instructions, that cause the one or more processors to generate the targeted information, cause the one or more processors to:
generate the targeted information based on the information that identifies the access point connectivity associated with the user device.

14. The non-transitory computer-readable medium of claim 8, where the one or more instructions, when executed by the one or more processors, further cause the one or more processors to:
receive, via the single interface, other information identifying the video content to be targeted to other user devices associated with other IPTV services,
the other IPTV services being different than the IPTV service; and
provide, to the other user devices, the other information identifying the video content to be targeted to the other user devices.

15. A method, comprising:
receiving, by a device and via a single interface of the device, information identifying video content to be targeted to a set of user devices associated with an Internet protocol television (IPTV) service;

receiving, by the device and via the single interface of the device, configuration information relating to the video content,
  the configuration information including:
    information identifying one or more device types,
      the one or more device types being selected from a group including:
        a set-top box,
        a cellular device, and
        a non-cellular device,
    subscription information, and
    information identifying whether the one or more device types are eligible to receive the information identifying the video content;
storing, by the device, the information identifying the video content in association with the configuration information;
receiving, by the device, information associated with a user device of the set of user devices,
  the information associated with the user device including a request for targeted information relating to the video content,
    the request for targeted information being based on a change in access network connectivity of the user device, and
  the information associated with the user device further including information associated with an access network restriction;
generating, by the device and using the information identifying the video content, the targeted information relating to the video content based on comparing the information associated with the user device and the configuration information and based on the information associated with the access network restriction; and
providing, by the device and to the user device, the targeted information relating to the video content to permit the user device to provide, for display, the targeted information relating to the video content in association with the IPTV service.

16. The method of claim 15, further comprising:
receiving information that identifies that the user device is the cellular device; and
where generating the targeted information comprises:
  generating the targeted information based on the user device being the cellular device.

17. The method of claim 15, further comprising:
receiving information that identifies an access network connectivity associated with the user device; and
where generating the targeted information comprises:
  generating the targeted information based on the information that identifies the access network connectivity associated with the user device.

18. The method of claim 15, further comprising:
determining, based on the subscription information, that the user device is not subscribed to receive the video content; and
where generating the targeted information related to the video content comprises:
  generating the targeted information based on the user device not being subscribed to receive the video content.

19. The method of claim 15, further comprising:
receiving information that identifies demographic information associated with an account of the user device; and
where generating the targeted information comprises:
  generating the targeted information based on the information that identifies the demographic information associated with the account of the user device.

20. The method of claim 15, further comprising:
receiving, via the single interface of the device, information identifying other video content that is to be targeted to other user devices associated with a set of other IPTV services; and
providing, to the other user devices, the information identifying the other video content.

* * * * *